United States Patent
Gobbi

[19]

[11] Patent Number: 6,142,128
[45] Date of Patent: Nov. 7, 2000

[54] MEANS FOR CONTROLLING THE DELIVERY OF GAS IN SELF-PROPULSION GAS SYSTEMS

[75] Inventor: Francesco Gobbi, Collebeato, Italy

[73] Assignee: EMER S.r.l.

[21] Appl. No.: 09/023,761

[22] Filed: Feb. 13, 1998

[30] Foreign Application Priority Data

Oct. 20, 1997 [IT] Italy ............................. BS97A0085

[51] Int. Cl.⁷ ..................................... F02B 43/00
[52] U.S. Cl. ........................ 123/527; 123/529; 137/613
[58] Field of Search ................... 123/527, 529, 123/198 DB, 198 D; 137/613

[56] References Cited

U.S. PATENT DOCUMENTS

| | | | |
|---|---|---|---|
| 4,044,794 | 8/1977 | Matthews | 137/613 |
| 4,545,345 | 10/1985 | Pagolin et al. | 123/299 |
| 4,579,096 | 4/1986 | Kobayashi et al. | 123/299 |
| 4,688,537 | 8/1987 | Calkins et al. | 123/557 |
| 4,718,448 | 1/1988 | Love et al. | 137/271 |
| 4,909,209 | 3/1990 | Takahasi | 123/27 CE |
| 5,012,781 | 5/1991 | Yokoyama et al. | 123/353 |
| 5,184,457 | 2/1993 | Hseu et al. | 60/39.14 |
| 5,199,456 | 4/1993 | Love et al. | 137/270 |
| 5,379,794 | 1/1995 | Brown | 137/75 |
| 5,483,943 | 1/1996 | Peters | 123/527 |
| 5,615,655 | 4/1997 | Shimizu | 123/406.24 |
| 5,752,489 | 5/1998 | Henderson et al. | 123/494 |
| 5,829,418 | 11/1998 | Tamura et al. | 123/529 |

*Primary Examiner*—Noah P. Kamen
*Assistant Examiner*—Hai Huynh
*Attorney, Agent, or Firm*—McGlew and Tuttle, P.C.

[57] ABSTRACT

A device for the control of the delivery of the gas in self-propulsion gas systems, in methane gas systems in particular. The system includes a gas cylinder under high pressure, a pipeline which conveys the gas from the cylinder to the engine and devices for controlling the flow and pressure of the gas in the pipeline. A device includes a manual valve or cock (18) per cylinder, at least one pressure reducing valve (19) and one solenoid valve (20), which are integrated into one unit (16), which has a body with channels for the gas between an inlet (I) of the gas under high pressure and an outlet (U) for the gas under the desired reduced pressure. The unit is attached, as a single entity, at the inlet, to the cylinder, and, at the outlet, to the gas pipeline directed towards the engine to be fed.

20 Claims, 4 Drawing Sheets

MEANS FOR CONTROLLING THE DELIVERY OF GAS IN SELF-PROPULSION GAS SYSTEMS

FIELD OF THE INVENTION

The present invention pertains to the means for controlling the delivery of gas between a gas cylinder and an engine in self-propulsion gas systems, in particular methane gas systems.

BACKGROUND OF THE INVENTION

A self-propulsion gas system generally comprises a gas cylinder or tank under high pressure arranged in the trunk of a vehicle, although away from the engine, a pipeline from the cylinder or reservoir to the engine, and valve and pressure reducing devices arranged along the pipeline for controlling the gas flow directed towards the engine. The pressure of the gas in the cylinder, if methane, may be, e.g., about 220 bar, and the pressure of the gas to the engine, depending on the feed system of the latter, may be about 0.1–1.0, on average 0.5 bar, or about 9 bar.

SUMMARY AND OBJECTS OF THE INVENTION

The present invention proposes to combine the valve and pressure reducing devices into a single unit and to mount the resulting unit on the gas cylinder, i.e., in the most upstream part of the pipeline for the gas directed towards the engine, with the advantage that a gas flow under reduced pressure passes through the pipeline, thus under conditions of greater safety.

Correspondingly, and according to the present invention, a manual valve or cock, a solenoid valve, and at least one pressure reducing valve are integrated in a single unit that can be attached to a cylinder of gas under high pressure, e.g., methane gas, and the reducing valve may be inside or outside the cylinder, and the solenoid valve may be downstream or upstream of the reducing valve. If necessary, and depending on the feed pressure of the gas to the engine, an additional pressure reducing stage may be provided in the downstream part of the pipeline near the distribution to the engine. If necessary, a heating system may also be provided at the reducing valve or reducing valves in the integrated unit.

The various features of the novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
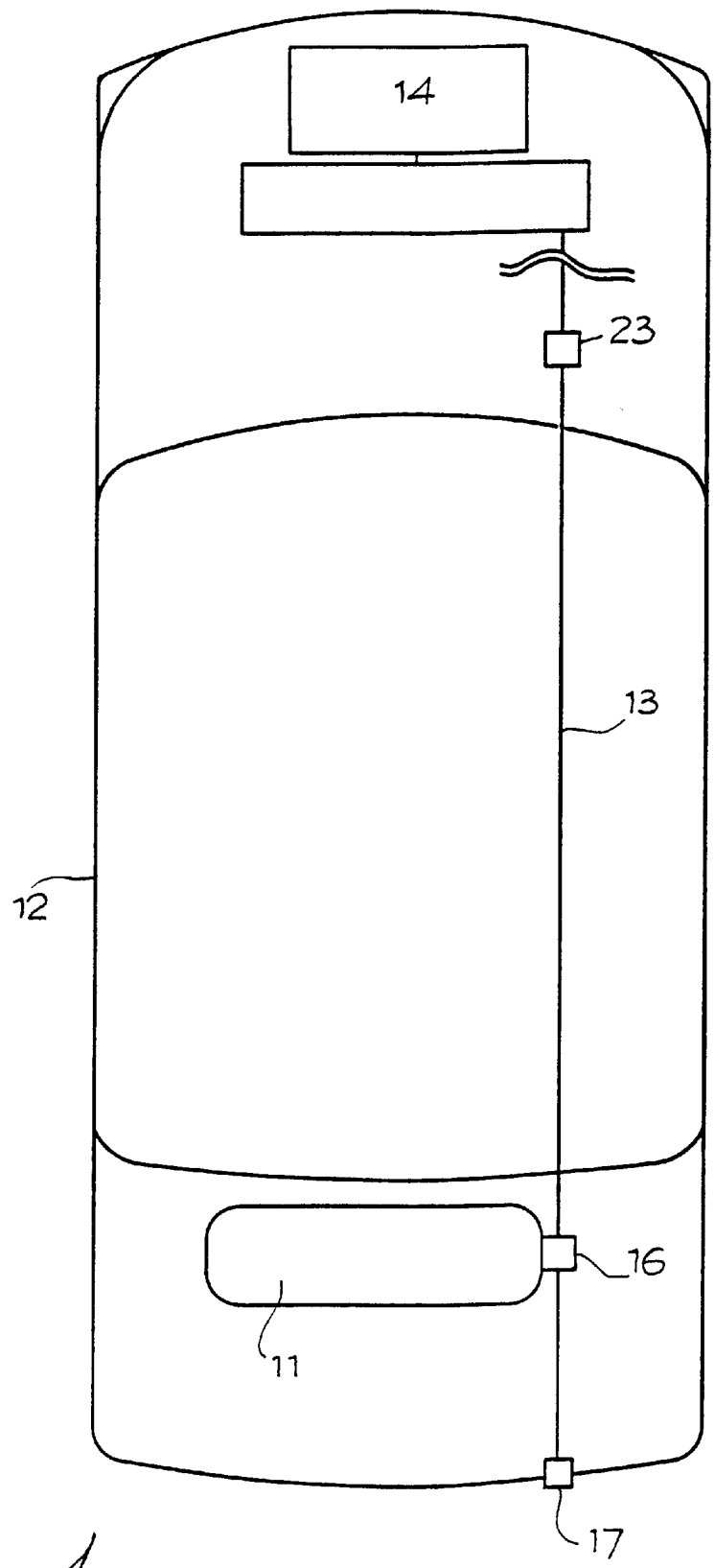
FIG. 1 is an enlarged diagram of a self-propulsion gas system.

Referring to the drawings in particular, the invention comprises a self-propulsion gas system, which comprises a cylinder or tank 11 of gas under pressure, such as methane at about 220 bar, e.g., which is arranged in the trunk of an automobile 12 and is connected, by means of a pipeline 13, to the engine 14 of the vehicle, is schematically shown in FIG. 1.

According to the present invention, an integrated unit (also referred to as a first unit) 16 for controlling the pressure and the flow of the gas directed towards the engine is mounted with the interposition of a sealing ring 15 on the cylinder or tank 11, i.e., at the beginning of the pipeline 13. The gas is charged into the cylinder by means of an external charge valve 17, which is connected to the integrated unit 16.

This integrated unit 16, which is represented simply with a square in the diagram of FIG. 1, practically comprises a pressure valve or cock 18 and a solenoid valve 20. These components are combined in one unit, i.e., in a single body 21 with channels for the gas from an inlet I up to an outlet U according to the corresponding arrows in FIGS. 3–6.

Figure 2:
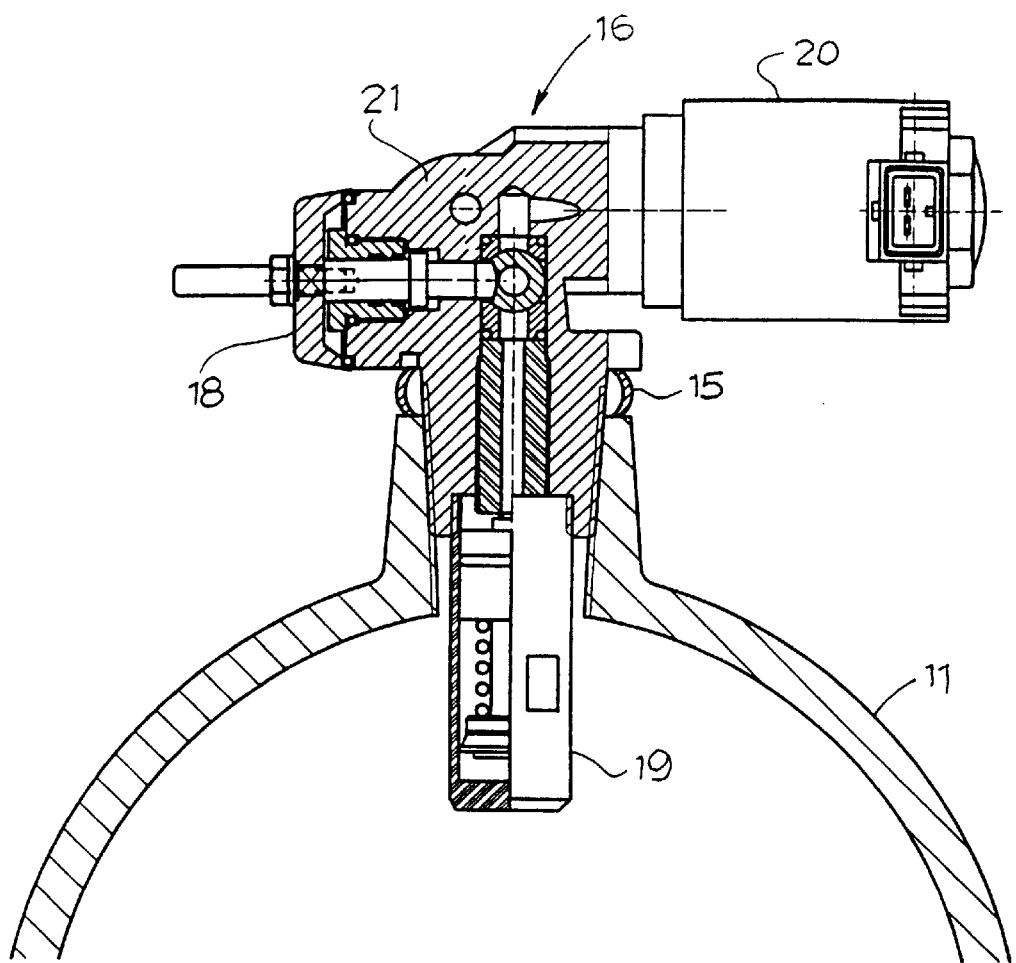
FIG. 2 is a sectional view of the integrated unit according to the present invention attached to a gas cylinder.

The pressure reducing valve 19 may be of a piston type. It may be arranged and oriented towards the interior of the cylinder 11 as shown in FIG. 2, and the solenoid valve 20 may be arranged at an angle with respect to the reducing valve, without, however, ruling out also a linear arrangement thereof.

Figure 4:
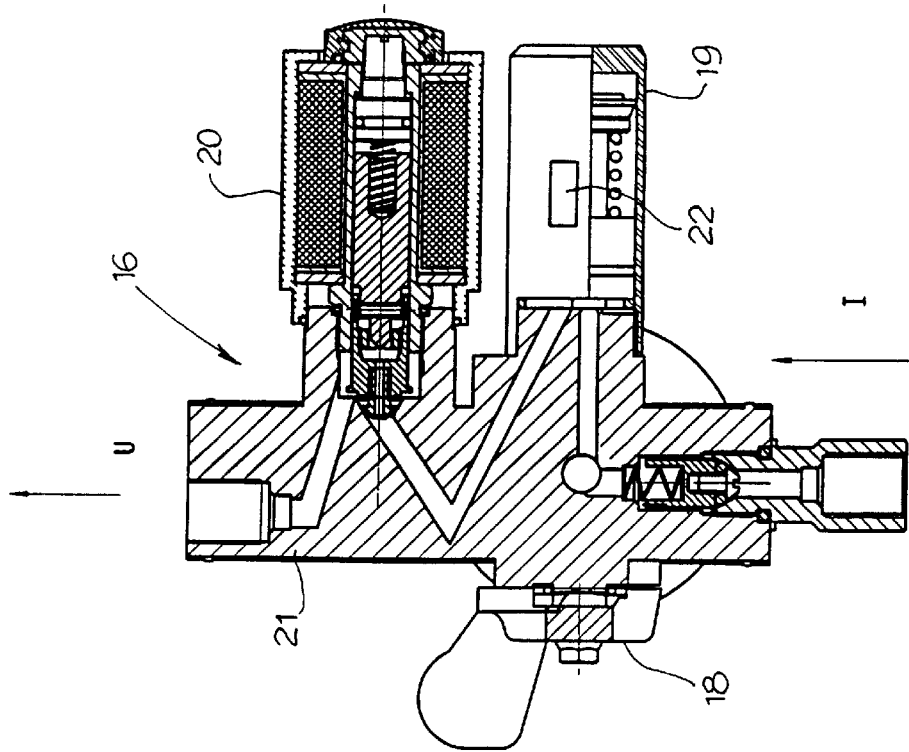
FIG. 4 is a sectional view, at the reducing valve and solenoid valve, a unit integrated with the solenoid valve downstream of the reducing valve.
Figure 3:
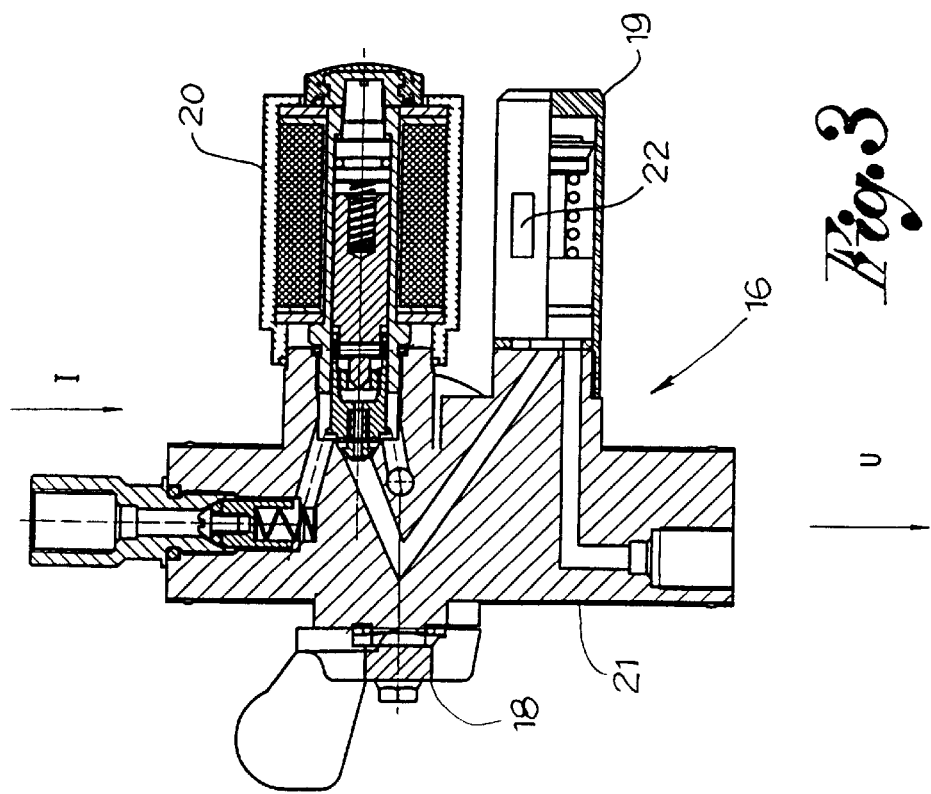
FIG. 3 is a sectional view, at the reducing valve and solenoid valve, a unit integrated with the solenoid valve upstream of the reducing valve.

In a different combination arrangement, as is shown in FIGS. 3 and 4, the pressure reducing valve 19 and the solenoid valve 20 are arranged in parallel with or not outside the cylinder, although in a position of not interfering with the manual valve or cock 18. With respect to the direction of the gas flow between inlet I and outlet U, the solenoid valve 20 may be upstream (FIG. 3) or downstream (FIG. 4) of the pressure reducing valve 19.

Figure 5:
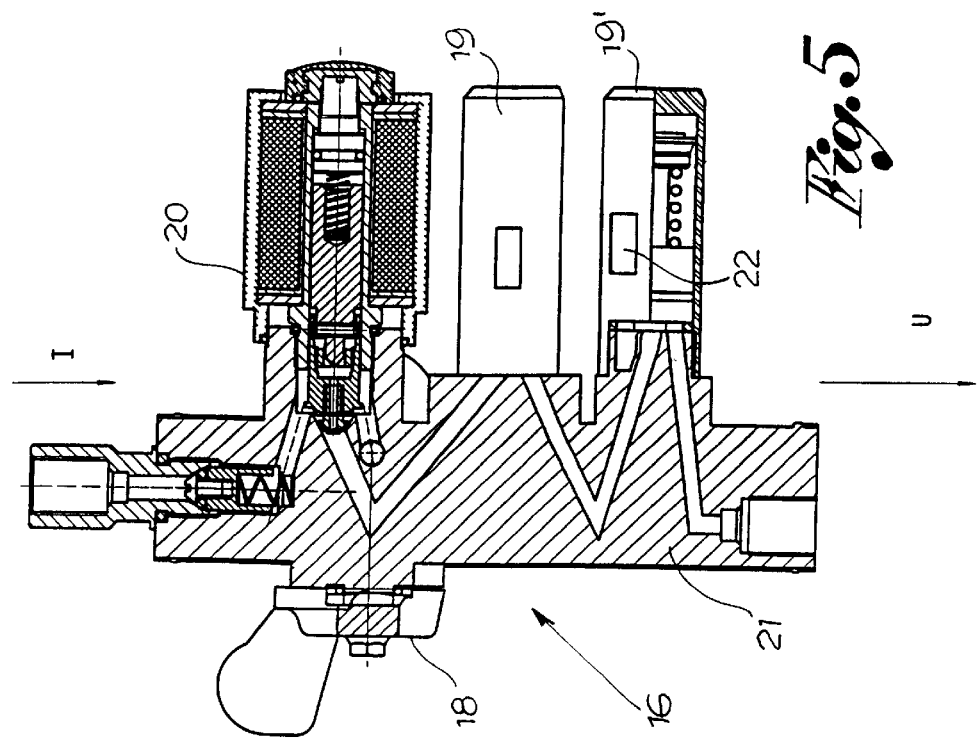
FIG. 5 is a sectional view analogous to FIG. 3, but of a unit integrated with two reducing valves in cascade pattern.
Figure 6:
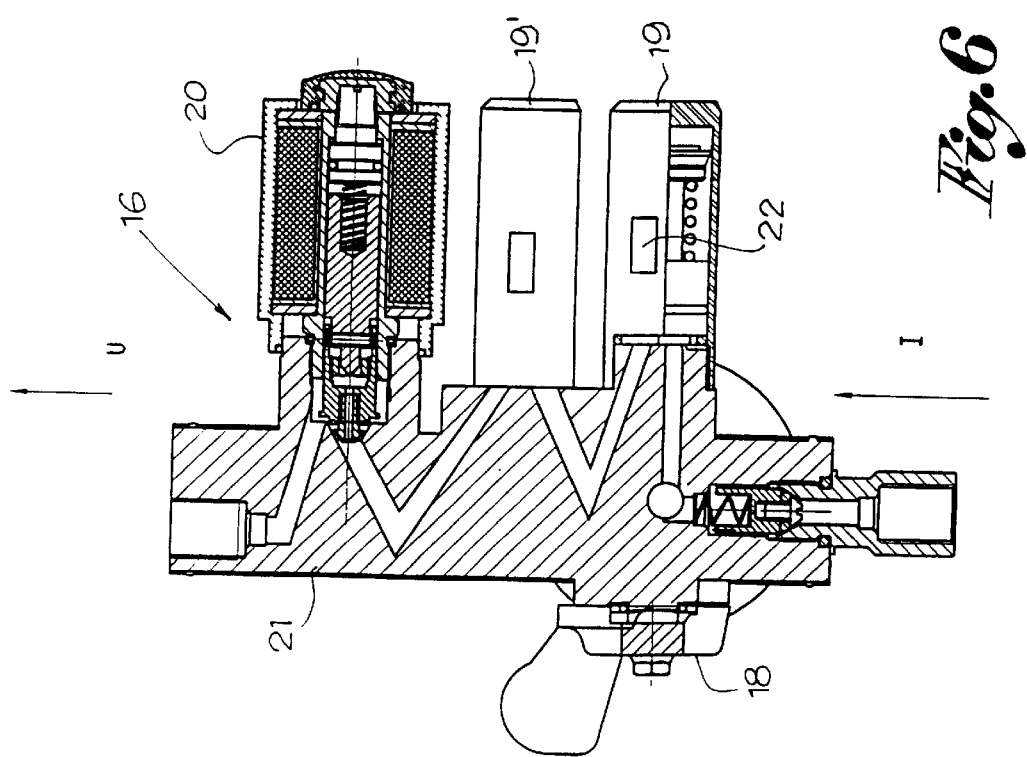
FIG. 6 is a sectional view analogous to FIG. 4, but of a unit integrated with two reducing valves in cascade pattern.

In another embodiment, as shown in FIGS. 5 and 6, the integrated unit 16 may comprise two said pressure reducing valves 19, 19' in cascade pattern for a reduction at successive stages of the pressure of the gas which arrives from the cylinder 11 at the inlet I of the integrated unit 16. Even in this case, the solenoid valve 20 may be upstream (FIG. 5) or downstream (FIG. 6) of the pressure reducing valves 19.

Figure 7:
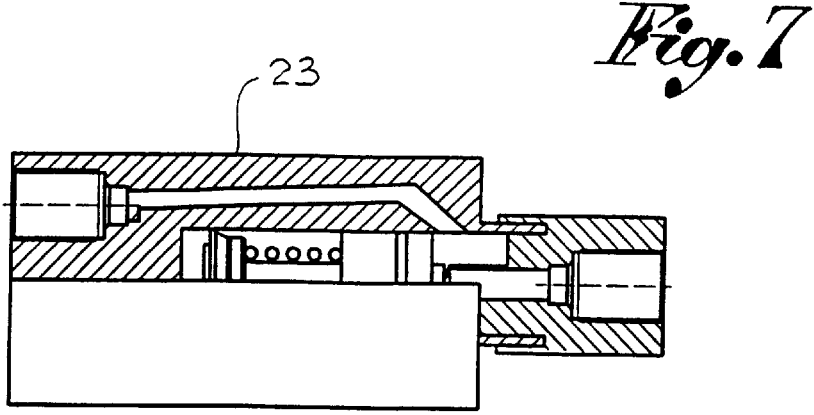
FIG. 7 is a partial sectional view of an optional reducing valve.

In each of the embodiments then, the or each pressure reducing valve 19, 19' may be provided with its own de-icing heater 22. As an alternative, the solenoid valve and the reducing valve or reducing valves 19, 19' may be incorporated or encapsulated with one another (e.g. share the same housing, encapsulating structure, etc.) so as to utilize the heating of the coil of the solenoid valve as heat for the de-icing At least one other pressure reducing valve 23 as shown in FIGS. 1 and 7, a reducing valve which contributes to reducing the pressure of the gas up to the value required for the feed of the engine, may be inserted along the pipeline 13 directed towards the engine or attached to the distributor of gas to the engine, if desired. In fact, depending on the type of feed to the engine, the pressure of the gas must be reduced to about 0.3–1.0 bar, on average to about 0.5 bar, for a conventional feed, or to about 9 bar for another feed system.

For example, starting from the pressure of a methane gas in the cylinder, usually about 220 bar, the pressure of the gas at the outlet U of the integrated unit 16 may be reduced to a value of about 21–15 bar. This pressure arrives at the additional reducing valve 23 where it is reduced to about 9 bar for delivery to the distributor of the engine, or the initial pressure of 220 bar is reduced by stages first to 21–15 bar at the outlet of the integrated unit 16 and then to about 9 bar in a next reducing valve and finally to 0.5 bar in an additional and final reducing valve 23 near the engine.

However, the methods and stages of reduction of the pressure may be widely varied and dependent on the final feed pressure of the stopped engine, and the combination and the integration of the components remain as described above.

While specific embodiments of the invention have been shown and described in detail to illustrate the application of the principles of the invention, it will be understood that the invention may be embodied otherwise without departing from such principles.

What is claimed is:

1. A self-propulsion gas engine system comprising:
    a gas cylinder under high pressure;
    a pipeline that conveys the gas from the cylinder to an engine;
    a device for controlling the flow and pressure of the gas in said pipeline, said device including a unit with
        a manual valve or cock associated with said cylinder,
        at least one pressure reducing valve,
        a solenoid valve integrated in said unit,
        a body with channels for the gas and including an inlet of gas under high pressure and an outlet of gas under the desired reduced pressure, said pressure reducing valve and said solenoid valve being connected to said body and forming a single integrated unit attached at said inlet of said body to said cylinder, and attached at said outlet of said body to the gas pipeline directed towards said engine.

2. The system in accordance with claim 1, wherein said pressure reducing valve is arranged in an interior of said cylinder, and said solenoid valve is in a position that is angled or aligned with said reducing valve.

3. The system in accordance with claim 1, wherein said pressure reducing valve is on an outside of said cylinder in parallel with or not with said solenoid valve.

4. The system in accordance with claim 3, wherein said solenoid valve is one of upstream or downstream of said pressure reducing valve with respect to a direction of gas flow between said inlet and said outlet of said integrated unit.

5. The system in accordance with claim 1, wherein at least two said pressure reducing valves are provided in a cascade pattern, which are or are not parallel with said solenoid valve.

6. The system in accordance with claim 5, wherein said solenoid valve is one of upstream or downstream of said pressure reducing valves with respect to a direction of the gas flow between gas inlet and said outlet of said integrated unit.

7. The system in accordance with claim 5, wherein said pressure reducing valve are each provided with a de-icing heater.

8. The system in accordance with claim 5, wherein said reducing valves and said solenoid valve are in a single body to utilize heat generated by said solenoid valve as a de-icing device.

9. The system in accordance with claim 1, wherein said pressure reducing valves is provided with a de-icing heater.

10. The system in accordance with claim 1, wherein said reducing valve and said solenoid valve are encapsulated with one another in order to utilize heat generated by said solenoid valve as a de-icing device.

11. The system in accordance with claim 1, further comprising:
    at least one said additional pressure reducing valve along said gas pipeline and closer to said engine than said unit or connected to a gas distributor of the engine.

12. The system in accordance with claim 1, wherein said pressure of said feed gas to said engine is reduced from a pressure of approximately 220 bar to a value of approximately 0.5 depending on a system of distributing the gas to the engine.

13. A device for the control of the delivery of methane gas in a self-propulsion gas system, the system including a gas cylinder under high pressure and a pipeline that conveys gas from the cylinder to an engine, the device comprising:
    a said manual valve or cock associated with said cylinder,
    at least one pressure reducing valve,
    a solenoid valve,
    a body with channels for the gas and including an inlet of gas under high pressure and an outlet of gas under the desired reduced pressure, said pressure reducing valve and said solenoid valve being connected to said body and forming a single integrated unit attached at said inlet of said body to said cylinder, and attached at said outlet of said body to the gas pipeline directed towards the engine.

14. The system in accordance with claim 13, wherein said pressure reducing valve is arranged one of:
    turned towards an interior of said cylinder, and said solenoid valve is in a position that is angled or aligned with said reducing valve; and
    on an outside of said cylinder in parallel with or not with said solenoid valve.

15. The system in accordance with claim 14, wherein said solenoid valve is one of upstream or downstream of said pressure reducing valve with respect to a direction of the gas flow between said inlet and said outlet of said integrated unit.

16. The system in accordance with claim 13, wherein at least two said pressure reducing valves are provided in a cascade pattern, which are or are not parallel with said solenoid valve.

17. The system in accordance with claim 16, wherein said reducing valves and said solenoid valve are in a single body to utilize heat generated by said solenoid valve as a de-icing device.

18. The system in accordance with claim 13, wherein said pressure reducing valve is provided with a de-icing heater.

19. A device for controlling gas delivery in a self-propulsion gas system of an automobile, the system including a gas cylinder and a pipeline conveying gas from the cylinder to an engine, the device comprising:
    a body having an inlet connectable to the cylinder for receiving gas at an inlet pressure, said body having an outlet connectable to the pipeline for discharging gas at a pressure less than said inlet pressure, said body having channels connecting said inlet to said outlet, said body including a manual valve, a pressure reducing valve, and a solenoid valve integrated in said body to form a single integrated unit positioned between the cylinder and the pipeline.

20. A device in accordance with claim 19, wherein:
    said pressure reducing valve is positioned inside the cylinder.

* * * * *